US010868718B2

(12) United States Patent
Haag et al.

(10) Patent No.: US 10,868,718 B2
(45) Date of Patent: Dec. 15, 2020

(54) SIMPLIFIED OPERATION OF A CENTRAL OFFICE POINT OF DELIVERY AND/OR FOR IMPROVED PORT DISCOVERY, VERIFICATION AND/OR AUTO-CONFIGURATION WITHIN A BROADBAND ACCESS NETWORK OF A TELECOMMUNICATIONS NETWORK

(71) Applicant: DEUTSCHE TELEKOM AG, Bonn (DE)

(72) Inventors: Thomas Haag, Rodgau (DE); Paul Wagner, Dreiech (DE); Hans-Joerg Kolbe, Darmstadt (DE); Robert Soukup, Frankfurt am Main (DE); Manuel Paul, Berlin (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/485,809

(22) PCT Filed: Feb. 5, 2018

(86) PCT No.: PCT/EP2018/052737
§ 371 (c)(1),
(2) Date: Aug. 14, 2019

(87) PCT Pub. No.: WO2018/166709
PCT Pub. Date: Sep. 20, 2018

(65) Prior Publication Data
US 2020/0052965 A1   Feb. 13, 2020

(30) Foreign Application Priority Data
Mar. 13, 2017   (EP) .................................. 17160638

(51) Int. Cl.
G06F 15/177   (2006.01)
H04L 12/24   (2006.01)

(52) U.S. Cl.
CPC ...... *H04L 41/0809* (2013.01); *H04L 41/0853* (2013.01); *H04L 41/0869* (2013.01); *H04L 41/0886* (2013.01)

(58) Field of Classification Search
USPC ....... 709/203, 206, 217, 219, 223, 224, 226, 709/228, 230, 232, 238
See application file for complete search history.

(56) References Cited

U.S. PATENT DOCUMENTS

2004/0267881 A1   12/2004 Yao et al.
2012/0018506 A1*  1/2012 Hammad ............... G06Q 30/06 235/375
2018/0359119 A1* 12/2018 Vermes ................ H04B 10/801

FOREIGN PATENT DOCUMENTS

EP   1528751 A2   5/2005

OTHER PUBLICATIONS

"Gigabit-capable passive optical networks (G-PON): ONT management and control interference specification; G.984.4 (02/08)", International Telecommunication Union, Feb. 22, 2008 (Feb. 22, 2008), pp. 1-44, XP055228121.

(Continued)

Primary Examiner — Quang N Nguyen
(74) Attorney, Agent, or Firm — Leydig, Voit & Mayer, Ltd.

(57) ABSTRACT

A method for operation of a central office point of delivery includes: in response to a pluggable interface module being plugged into an access node port of a line termination node of the central office point of delivery, transmitting, by the line termination node, a request message to a control node of the central office point of delivery, wherein the request message comprises interface module information related to (Continued)

the pluggable interface module, and wherein an activation clearance is requested, via the request message, from the control node; receiving, by the line termination node, from the control node, an acknowledgement message related to the activation clearance requested by the request message, wherein the acknowledgement message corresponds to a verification operation and/or activation clearance operation having been successful; and activating, by the line termination node and/or by the access port node, the pluggable interface module.

12 Claims, 2 Drawing Sheets

(56) References Cited

OTHER PUBLICATIONS

Microsoft: "How plug and play works", Mar. 28, 2003 (Mar. 28, 2003), XP002411725, the whole document.
Larry Peterson et al: "Central Office Re-Architectured as a Data Center", IEEE Communications Magazine, Oct. 1, 2016 (Oct. 1, 2016), pp. 96-101, XP055399082, the whole document.

* cited by examiner

SIMPLIFIED OPERATION OF A CENTRAL OFFICE POINT OF DELIVERY AND/OR FOR IMPROVED PORT DISCOVERY, VERIFICATION AND/OR AUTO-CONFIGURATION WITHIN A BROADBAND ACCESS NETWORK OF A TELECOMMUNICATIONS NETWORK

CROSS-REFERENCE TO RELATED APPLICATIONS

This application is a U.S. National Phase application under 35 U.S.C. § 371 of International Application No. PCT/EP2018/052737, filed on Feb. 5, 2018, and claims benefit to European Patent Application No. EP 17160638.7, filed on Mar. 13, 2017. The International Application was published in English on Sep. 20, 2018 as WO 2018/166709 A1 under PCT Article 21(2).

FIELD

The present invention relates a method for improved and simplified operation of a central office point of delivery and/or for improved port discovery, verification and/or auto-configuration within a broadband access network of a telecommunications network, wherein the central office point of delivery comprises at least one control node and a plurality of line termination nodes, wherein each one of the plurality of line termination nodes comprises a certain number of access node ports, wherein each access node port of the plurality of line termination nodes is enabled to receive or to be connected to one of a plurality of pluggable interface modules.

Furthermore, the present invention relates to a telecommunications network for improved and simplified operation of a central office point of delivery and/or for improved port discovery, verification and/or auto-configuration within a broadband access network of the telecommunications network, wherein the central office point of delivery comprises at least one control node and a plurality of line termination nodes, wherein each one of the plurality of line termination nodes comprises a certain number of access node ports, wherein each access node port of the plurality of line termination nodes is enabled to receive or to be connected to one of a plurality of pluggable interface modules.

Additionally, the present invention relates to a system for improved and simplified operation of a central office point of delivery and/or for improved port discovery, verification and/or auto-configuration within a broadband access network of a telecommunications network, wherein the system comprises the telecommunications network and wherein the central office point of delivery comprises at least one control node and a plurality of line termination nodes, wherein each one of the plurality of line termination nodes comprises a certain number of access node ports, wherein each access node port of the plurality of line termination nodes is enabled to receive or to be connected to one of a plurality of pluggable interface modules.

Furthermore, the present invention relates to a control node of a central office point of delivery of a broadband access network, a program, and a computer program product for improved and simplified operation of a central office point of delivery and/or for improved port discovery, verification and/or auto-configuration within a broadband access network of a telecommunications network.

BACKGROUND

The exchange of packetized information in broadband communication systems or telecommunications networks, both in fixed-line as in wireless communication systems (or fixed-line communication networks and mobile communication networks) has already grown dramatically and probably will also grow in the future due to the rapid spread of different data services in such communication networks.

The present invention generally relates to the area of aggregation networks linking remote or central access nodes to a backbone network or core network of the telecommunications network, e.g. broadband access network platforms such as 5G or CORD (Central Office Re-architected as a Data Center).

Typically in such architectures, multiple network termination ports are aggregated by an access node (e.g. a DSLAM device (Digital Subscriber Line Access Multiplexer) or an OLT (Optical Line Terminal) device). Each network termination port is equipped with a pluggable interface module which supports technology-dependent adaptation of a variety of physical media, such as, e.g., fiber or copper).

In today's broadband networks, the access node (e.g. DSLAM, OLT) typically provides system-specific local port management. This implies system vendor qualified interface modules. The network operator building and operating the broadband access network therefore is either obliged to use vendor verified modules or to disable this feature as factory setting, leading typically to complex, labor-intense and error-prone use of arbitrary pluggable interface modules and, potentially, to the misuse of uncertified interface modules without efficient administration and operation.

SUMMARY

In an exemplary embodiment, the present invention provides a method for operation of a central office point of delivery. The method includes: in response to a pluggable interface module being plugged into an access node port of a line termination node of the central office point of delivery, transmitting, by the line termination node, a request message to a control node of the central office point of delivery, wherein the central office point of delivery comprises at least one control node and a plurality of line termination nodes, wherein each line termination node of the plurality of line termination nodes comprises a number of access node ports, wherein each access node port of the plurality of access node ports is configured to receive or be connected to one of a plurality of pluggable interface modules, wherein the request message comprises interface module information related to the pluggable interface module, and wherein an activation clearance is requested, via the request message, from the control node; receiving, by the line termination node, from the control node, an acknowledgement message related to the activation clearance requested by the request message, wherein the acknowledgement message corresponds to a verification operation and/or activation clearance operation having been successful; and activating, by the line termination node and/or by the access port node, the pluggable interface module.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
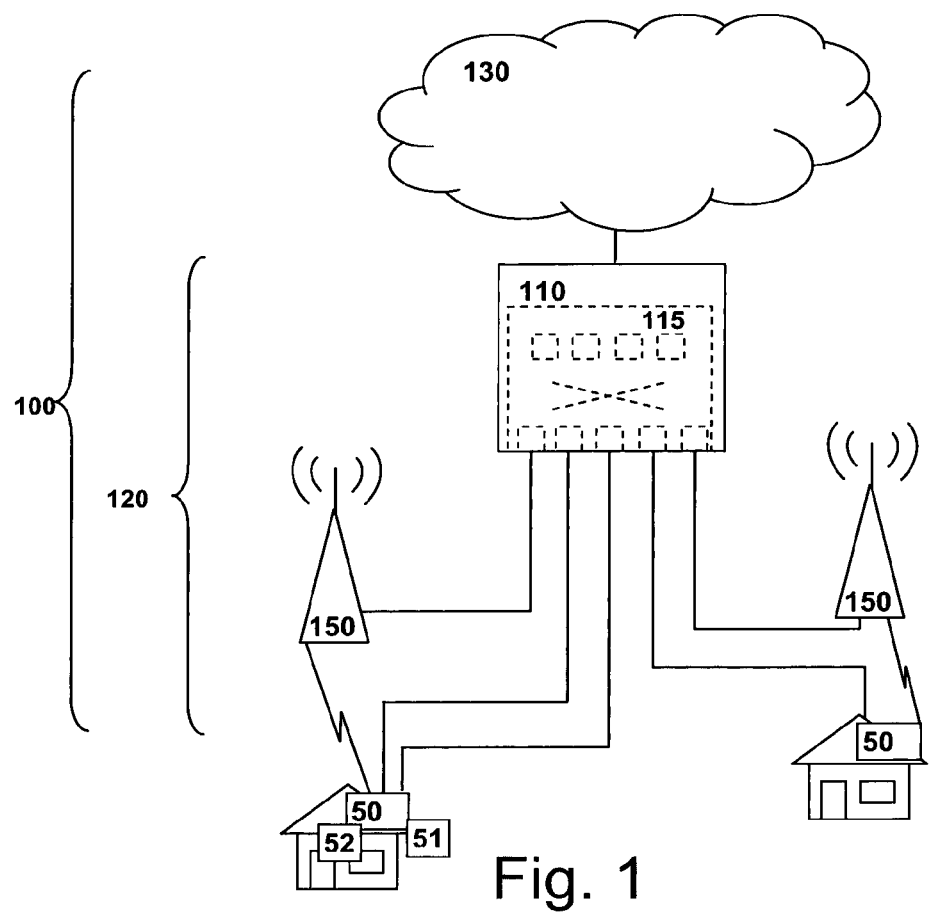
FIG. 1 schematically illustrates a telecommunications network according to the present invention, having a broadband access network, and wherein a logical or physical central office point of delivery (being part of the broadband access network) is handling different access possibilities.

Exemplary embodiments of the present invention provide a technically simple, effective and cost effective solution for improved and simplified operation of a central office point of delivery and/or for improved port discovery, verification and/or auto-configuration within a broadband access network of a telecommunications network, wherein the central office point of delivery comprises at least one control node and a plurality of line termination nodes, wherein each one of the plurality of line termination nodes comprises a certain number of access node ports, wherein each access node port of the plurality of line termination nodes is enabled to receive or to be connected to one of a plurality of pluggable interface modules. Further exemplary embodiments of the present invention provide a corresponding telecommunications network, a corresponding system, and a corresponding central office point of delivery.

In an exemplary embodiment, the present invention provides a method for improved and simplified operation of a central office point of delivery and/or for improved port discovery, verification and/or auto-configuration within a broadband access network of a telecommunications network,
wherein the central office point of delivery comprises at least one control node and a plurality of line termination nodes, wherein each one of the plurality of line termination nodes comprises a certain number of access node ports, wherein each access node port of the plurality of line termination nodes is enabled to receive or to be connected to one of a plurality of pluggable interface modules,
wherein, in order to provide for improved port discovery, verification and/or auto-configuration within the broadband access network and/or within the central office point of delivery, the method comprises the following steps:
 in a first step, a specific pluggable interface module is plugged into a specific access node port of a specific line termination node,
 in a second step, subsequent to the first step, a request message is transmitted, by the specific line termination node, to the control node, wherein the request message comprises interface module information related to the specific pluggable interface module, and wherein an activation clearance is requested, via the request message, from the control node,
 in a third step, subsequent to the second step, the specific line termination node receives, from the control node and in case that a verification operation and/or an activation clearance operation is successfully termi-
nated, an acknowledgement message related to the activation clearance requested by the request message,
 in a fourth step, subsequent to the second step, the specific pluggable interface module is activated by the specific line termination node and/or by its specific access node port.

It is thereby advantageously possible according to the present invention to provide a solution such that improved port discovery, verification and/or auto-configuration is possible within a broadband access network. Especially, it is advantageously possible according to the present invention to automatically detect and validate the type of interface modules.

In conventionally known broadband networks, an access node (or a line termination node) typically provides system-specific local port management which implies system vendor qualified and/or verified interface modules, thus leading to the operator being required to either use vendor verified interface modules or to disable this feature. Hence, the operator loses the functionality to automatically detect and validate the type of interface modules as there is typically no possibility of auto-detection and verification of operator-selected pluggable (or physical) interface module types being inserted in the access node port (or line termination node port). Also in the context of software defined networks (SDN), there is typically no auto-discovery, verification and auto-configuration of pluggable interface modules against a centralized database (which hosts a set of certificates of verified and certified interface module types) in central office architectures (such as the CORD-architecture). Exemplary embodiments of the present invention provide an interworking and message flow to verify if suitable interface modules are used. Thereby, it is advantageously possible to realize a centralized and automated solution for the management of physical (pluggable) interface modules, comprising an auto-detection functionality and/or an auto-discovery functionality and/or an auto configuration functionality in a centralized way (as well as, especially, verification by a centralized database and/or centralized media-dependent driver management and administration). This advantageously enables zero-touch-activation of interface modules in a software defined network-based line termination node (such as an OLT) in software defined network-based access networks.

It is advantageously possible according to the present invention to achieve improved port discovery, verification and/or auto-configuration of pluggable interface modules within the broadband access network and/or within the central office point of delivery, via—after plugging a specific pluggable interface module into a specific access node port of a specific line termination node—transmitting a request message from the specific line termination node to the control node, the request message comprising interface module information related to the specific pluggable interface module, and, via the request message, requesting an activation clearance from the control node, wherein an acknowledgement message, related to the activation clearance requested via the request message, is transmitted from the control node to the specific line termination node in case that a verification operation and/or an activation clearance operation is successfully terminated (either within the control node, or, requested by the control node, from a database entity), wherein, subsequently, the specific pluggable interface module is activated by the specific line termination node and/or by its specific access node port.

The telecommunications network according to the present invention may be a fixed-line telecommunications network or a mobile communication network but preferably is a telecommunications network having both aspects (or parts) of a fixed-line telecommunications network (or being a fixed-line telecommunications network in such parts) and aspects (or parts) of a mobile communication network (or being a mobile communication network in such parts); such networks are also known under the term fixed-mobile-convergence networks (FMC networks).

Furthermore, it is advantageously possible and preferred according to the present invention that the central office point of delivery and/or the broadband access network comprises—besides the at least one control node—a database entity, wherein the at least one control node is able to access the database entity, wherein the method furthermore comprises the following steps:

- in a fifth step, subsequent to the second step and prior to the third step, a verification request message is transmitted, by the control node, to the database entity, wherein the verification request message comprises at least part of the interface module information related to the specific pluggable interface module,
- in a sixth step, subsequent to the fifth step and prior to the third step, the verification operation and/or the activation clearance operation is performed at the database entity,
- in a seventh step, subsequent to the sixth step and prior to the third step, a verification acknowledgement message is transmitted, by the database entity, to the control node, wherein the verification acknowledgement message comprises, in case that the verification operation and/or the activation clearance operation is successfully terminated, an acknowledgement information related to the specific pluggable interface module being permitted to be activated at the specific access node port, wherein, subsequent to the seventh step and as part of the third step, the verification acknowledgement message is especially forwarded, by the specific line termination node, as the acknowledgement message related to the activation clearance requested by the request message.

Via requesting, by the control node, a verification acknowledgement message from a database entity (via a verification request message), and via performing the verification operation and/or the activation clearance operation at the database entity, it is advantageously possible to centrally perform administration and management of, of course, the specific pluggable interface module (plugged into the specific access node port of the specific line termination node) but especially a plurality of or all of the pluggable interface modules plugged into the various of access node ports within the broadband access network considered.

Furthermore, and according to an alternative embodiment of the present invention, it is preferred that the method comprises an eighth step, subsequent to the first step and prior to the second step, wherein in the eighth step, an interface module discovery message is transmitted, by the specific line termination node and/or by the specific access node port of the specific line termination node, to the specific pluggable interface module, wherein, subsequently and in the eighth step, a discovery response message is transmitted, by the specific pluggable interface module, to the specific line termination node and/or to the specific access node port of the specific line termination node, wherein the discovery response message comprises interface module information related to the specific pluggable interface module.

Thereby, it is advantageously possible to provide for a discovery of the specific pluggable interface module such that the verification operation and/or the activation clearance operation can be performed on a solid basis. Especially it is advantageously possible that—either instead of performing or conducting the eighth step or in addition to performing or conducting the eighth step—the line termination node and/or the access node port initially (i.e. after plugging the pluggable interface module into the access node port) detects the pluggable interface module, i.e. it detects the presence of the pluggable interface module, and that the line termination node and/or the access node port accesses a memory of the pluggable interface module in order to access the interface module information. Especially, the access node ports are configured to be in an autosensing mode. The insertion of a pluggable interface module, i.e. the act of inserting an interface plugin (or pluggable interface module)—either an electrical, or an optical or another type of pluggable interface module—into an access node port, triggers an interface module discovery message sent out by the access node port to request the interface type information of the pluggable interface module.

According to a further preferred embodiment of the present invention, the verification request message—transmitted, in the fifth step, by the control node to the database entity—comprises a type verification request, wherein, via the type verification request, the database entity is queried for interface module type and/or identification information related to the specific pluggable interface module, wherein, especially, the verification acknowledgement message—transmitted, in the seventh step, by the database entity to the control node—comprises, in case that the database entity comprises interface module type and/or identification information related to the specific pluggable interface module, an acknowledgement information related to the specific pluggable interface module being permitted to be activated at the specific access node port.

Thereby, it is advantageously possible to safely integrate a plurality of pluggable interface modules—even pluggable interface modules of a different type and/or of a different supplier or original equipment manufacturer—in a controlled manner in the broadband access network, and to be able to integrate different types of pluggable interface modules comparably easily and in a flexible manner.

According to further embodiments of the present invention, —in case that the database entity comprises interface module type and/or identification information related to the specific pluggable interface module, and, hence, acknowledgement information, related to the specific pluggable interface module being permitted to be activated at the specific access node port, is transmitted or is to be transmitted in the seventh step—in case that a driver module corresponding to the type of the specific pluggable interface module is not yet in use by the control node, the control node accesses such a driver module corresponding to the type of the specific pluggable interface module from a repository entity.

Thereby, it is advantageously possible to realize the broadband access network such that also new types of pluggable interface modules are able to be added to the set of existing types of pluggable interface modules—that are already used within the broadband access network—comparably easily and in a flexible manner.

Furthermore, according to an embodiment of the present invention, as part of the verification operation and/or the activation clearance operation in the sixth step, a type verification and/or a topology verification is performed by the database entity, wherein the verification operation and/or the activation clearance operation is successfully terminated only in case that the specific pluggable interface module fits the specific access node port of the specific line termination node and/or a network topology property corresponding to the specific access node port of the specific line termination node.

Thereby, it is advantageously possible to easily and effectively implement exemplary embodiments of the inventive method.

According to a further embodiment of the present invention, the broadband access network comprises a switching fabric comprising a plurality of spine network nodes and a plurality of leaf network nodes, wherein the plurality of line termination nodes are part of the switching fabric or connected to the switching fabric.

Thereby, it is advantageously possible to easily and effectively implement exemplary embodiments of the inventive method.

Furthermore, the present invention relates to a telecommunications network for improved and simplified operation of a central office point of delivery and/or for improved port discovery, verification and/or auto-configuration within a broadband access network of the telecommunications network,
wherein the central office point of delivery comprises at least one control node and a plurality of line termination nodes, wherein each one of the plurality of line termination nodes comprises a certain number of access node ports, wherein each access node port of the plurality of line termination nodes is enabled to receive or to be connected to one of a plurality of pluggable interface modules,
wherein, in order to provide for improved port discovery, verification and/or auto-configuration within the broadband access network and/or within the central office point of delivery, the telecommunications network is configured such that:
  a specific pluggable interface module is plugged into a specific access node port of a specific line termination node,
  a request message is transmitted, by the specific line termination node, to the control node, wherein the request message comprises interface module information related to the specific pluggable interface module, and wherein an activation clearance is requested, via the request message, from the control node,
  the specific line termination node receives, from the control node and in case that a verification operation and/or an activation clearance operation is successfully terminated, an acknowledgement message related to the activation clearance requested by the request message,
  the specific pluggable interface module is activated by the specific line termination node and/or by its specific access node port.

Furthermore, the present invention relates to a system for improved and simplified operation of a central office point of delivery and/or for improved port discovery, verification and/or auto-configuration within a broadband access network of a telecommunications network,
wherein the system comprises the telecommunications network and wherein the central office point of delivery comprises at least one control node and a plurality of line termination nodes, wherein each one of the plurality of line termination nodes comprises a certain number of access node ports, wherein each access node port of the plurality of line termination nodes is enabled to receive or to be connected to one of a plurality of pluggable interface modules,
wherein, in order to provide for improved port discovery, verification and/or auto-configuration within the broadband access network and/or within the central office point of delivery, the system is configured such that:
  a specific pluggable interface module is plugged into a specific access node port of a specific line termination node,
  a request message is transmitted, by the specific line termination node, to the control node, wherein the request message comprises interface module information related to the specific pluggable interface module, and wherein an activation clearance is requested, via the request message, from the control node,
  the specific line termination node receives, from the control node and in case that a verification operation and/or an activation clearance operation is successfully terminated, an acknowledgement message related to the activation clearance requested by the request message,
  the specific pluggable interface module is activated by the specific line termination node and/or by its specific access node port.

According to a preferred embodiment of the present invention—especially with respect to exemplary embodiments of the inventive telecommunications network and/or with respect to exemplary embodiments of the inventive system —, the central office point of delivery and/or the broadband access network comprises—besides the at least one control node—a database entity, wherein the at least one control node is able to access the database entity, wherein the telecommunications network and/or the system is configured such that:
  a verification request message is transmitted, by the control node, to the database entity, wherein the verification request message comprises at least part of the interface module information related to the specific pluggable interface module,
  the verification operation and/or the activation clearance operation is performed at the database entity,
  a verification acknowledgement message is transmitted, by the database entity, to the control node, wherein the verification acknowledgement message comprises, in case that the verification operation and/or the activation clearance operation is successfully terminated, acknowledgement information related to the specific pluggable interface module being permitted to be activated at the specific access node port, wherein the verification acknowledgement message is especially forwarded, by the specific line termination node, as the acknowledgement message related to the activation clearance requested by the request message.

According to a preferred embodiment of the present invention—especially with respect to exemplary embodiments of the inventive telecommunications network and/or with respect to exemplary embodiments of the inventive system —, the telecommunications network and/or the system is configured such that an interface module discovery message is transmitted, by the specific line termination node and/or by the specific access node port of the specific line termination node, to the specific pluggable interface module, wherein a discovery response message is transmitted, by the specific pluggable interface module, to the specific line termination node and/or to the specific access node port of the specific line termination node, wherein the discovery response message comprises interface module information related to the specific pluggable interface module.

Additionally, the present invention relates to a control node of a central office point of delivery of a broadband access network for improved and simplified operation of the central office point of delivery and/or for improved port discovery, verification and/or auto-configuration within the broadband access network of the telecommunications network, wherein the control node is part of the central office point of delivery, wherein the central office point of delivery comprises a plurality of line termination nodes, wherein each one of the plurality of line termination nodes comprises a certain number of access node ports, wherein each access node port of the plurality of line termination nodes is enabled to receive or to be connected to one of a plurality of pluggable interface modules, wherein, in order to provide for improved port discovery, verification and/or auto-configuration within the broadband access network and/or within the central office point of delivery, the control node is configured such that:

- a request message, transmitted by a specific line termination node, is received by the control node in case that a specific pluggable interface module is plugged into a specific access node port of the specific line termination node, wherein the request message comprises interface module information related to the specific pluggable interface module, and wherein, via the request message, an activation clearance is requested,
- in case that a verification operation and/or an activation clearance operation is successfully terminated, an acknowledgement message related to the activation clearance requested by the request message is transmitted by the control node to the specific line termination node, resulting in the specific pluggable interface module being activated by the specific line termination node and/or by its specific access node port.

Still additionally, the present invention relates to a program comprising a computer readable program code which, when executed on a computer and/or on a logical or physical central office point of delivery and/or on a control node of a central office point of delivery, or in part on a logical or physical central office point of delivery and/or in part on a control node of the central office point of delivery, causes the computer and/or the logical or physical central office point of delivery and/or the control node of the central office point of delivery to perform exemplary embodiments of the inventive method.

Furthermore, the present invention relates to a computer program product for improved and simplified operation of a central office point of delivery and/or for improved port discovery, verification and/or auto-configuration within a broadband access network of a telecommunications network, the computer program product comprising a computer program stored on a storage medium, the computer program comprising program code which, when executed on a computer and/or on a logical or physical central office point of delivery and/or on a control node of a central office point of delivery, or in part on a logical or physical central office point of delivery and/or in part on a control node of the central office point of delivery, causes the computer and/or the logical or physical central office point of delivery and/or the control node of the central office point of delivery to perform exemplary embodiments of the inventive method.

These and other characteristics, features and advantages of the present invention will become apparent from the following detailed description, taken in conjunction with the accompanying drawings, which illustrate, by way of example, principles of the invention. The description is given for the sake of example only, without limiting the scope of the invention. The reference figures quoted below refer to the attached drawings.

The present invention will be described with respect to exemplary embodiments and with reference to certain drawings but the invention is not limited thereto but only by the claims. The drawings described are only illustrative and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a telecommunications network 100 according to the present invention is schematically shown, having—preferably—a fixed line part and a mobile (or cellular) part (schematically illustrated via base station entities 150). According to such a preferred embodiment of the telecommunications network 100 comprising a fixed line part and a mobile (or cellular) part, it is provided for the user equipments or client devices 51, 52 being able to use different access technologies. However, according to the present invention, also a telecommunications network 100 of the "fixed-line-only" type, or a telecommunications network 100 of the "mobile (or cellular)-only" type is possible to be used according to the present invention. The telecommunications network 100 comprises at least one logical or physical central office point of delivery 110 that is preferably realized within a data center and that is especially handling different access requirements, especially different access possibilities, of the client devices 51, 52 to network functionalities 190 provided by the telecommunications network 100 or via the telecommunications network 100. The client devices 51, 52 are typically connected to the logical or physical central office point of delivery 110 via a customer premises equipment device 50 or via a customer premises equipment functionality that might be built in the client devices 51, 52. Preferably but not necessarily, the central office point of delivery 110 comprises a switching fabric 115 comprising a plurality of spine network nodes and typically also a plurality of leaf network nodes.

Figure 2:
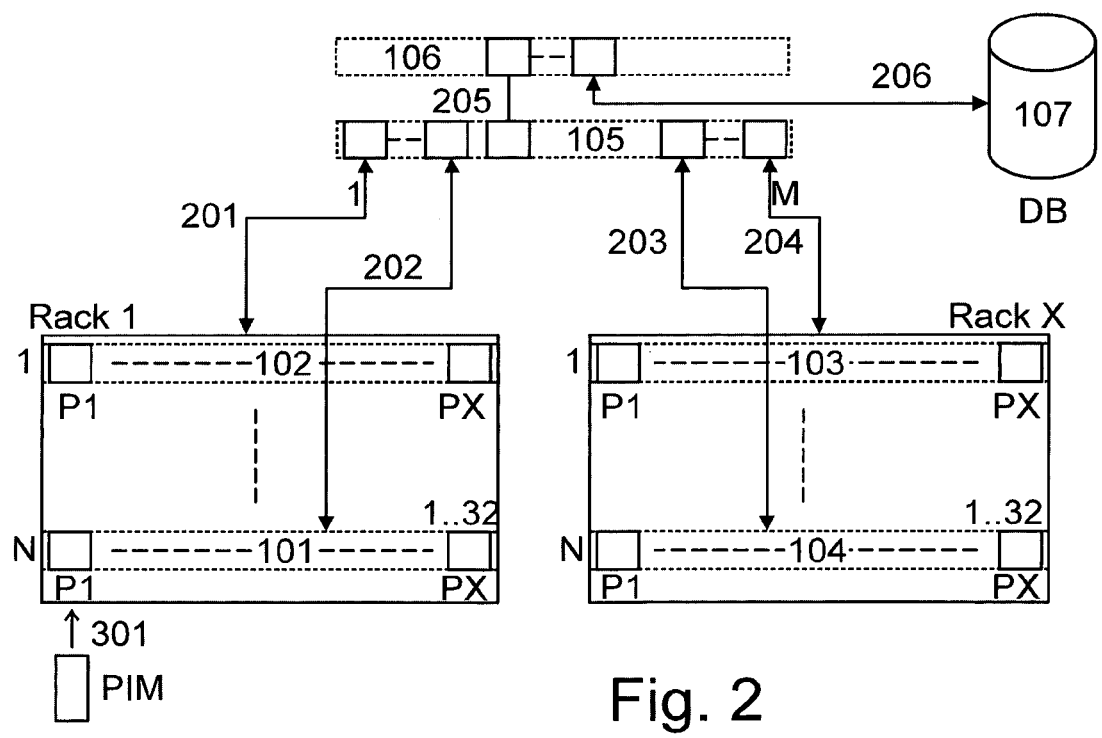
FIG. 2 schematically illustrates a part of a broadband access network of a telecommunications network, wherein the represented part of the telecommunications network comprises—besides a control node and a database entity—a plurality of line termination nodes, each having a plurality of access node ports.

FIG. 2 schematically illustrates a part of a broadband access network 120 of a telecommunications network 100, wherein the represented part of the telecommunications network 100 comprises—besides a control node 106 and a database entity 107—a plurality of line termination nodes 101, 102, 103, 104, having each a plurality of access node ports P1, . . . , PX. In the example represented in FIG. 2, the broadband access network 120 comprises four line termination nodes, a first line termination node 101, a second line termination node 102, a third line termination node 103, and a fourth line termination node 104. Each one of the plurality of line termination nodes 101, 102, 103, 104 comprises a plurality of access node ports; for example each line termination node has 32 access node ports. For each of the line termination nodes, these (e.g., 32) access node ports are labeled P1, ..., PX in FIG. 2, however, it is evident that each access node port of each line termination node is a different access node port entity.

Each one of the plurality of access node ports P1, ..., PX of the plurality of line termination nodes 101, 102, 103, 104 is enabled to receive or to be connected to one of a plurality of pluggable interface modules. In FIG. 2, only one pluggable interface module 301 is schematically shown. This exemplary pluggable interface module 301 is schematically shown a being plugged or to be plugged into the first access node port P1 of the first line termination node 101. In the context of the present invention, in order to separate these "specific" entities from the other entities of the same kind within the broadband access network, this pluggable interface module 301 is also called the specific pluggable interface module 301, and this (first) access node port P1 (of the first line termination node 101) is also called the specific access node port P1, and this first line termination node 101 is also called the specific line termination node 101.

According to the present invention, improved and simplified operation of the central office point of delivery 110 and/or improved port discovery, verification and/or autoconfiguration within a broadband access network 120 is provided, wherein the method comprises the following steps:
in a first step, the specific pluggable interface module 301 is plugged into the specific access node port P1 of the specific line termination node 101,
in a second step, subsequent to the first step, a request message is transmitted, by the specific line termination node 101, to the control node 106, wherein the request message comprises interface module information related to the specific pluggable interface module 301, and wherein an activation clearance is requested, via the request message, from the control node 106,
in a third step, subsequent to the second step, the specific line termination node 101 receives, from the control node 106 and in case that a verification operation and/or an activation clearance operation is successfully terminated, an acknowledgement message related to the activation clearance requested by the request message,
in a fourth step, subsequent to the second step, the specific pluggable interface module 301 is activated by the specific line termination node 101 and/or by its specific access node port P1.

In this context, FIG. 2 shows the architecture, in principle, and the relevant interconnections between the different entities within the broadband access network 120 according to the present invention. Each line termination node 101, 102, 103, 104 (also called access node blade) is connected via a duct cable (or connection) 201, 202, 203, 204 with a network switch (TOR (top of rack) or an alternative device) 105. This network switch 105 provides the connection (of the line termination nodes 101, 102, 103, 104) to the control node 106. The control node 106 (also called head node) is preferably connected to a database entity 107 via a connection 206.

If the specific interface module 301 is plugged into the specific access node port, this event triggers a request (via cable or connection 201 and via the switch 105 and via cable or connection 205) to the control node 106.

According to a preferred embodiment of the present invention, this request to the control node 106 (especially via a program within the control node 106) is translated into a database, especially triggers a database request 206 towards the centralized database entity 107.

The database responds with an authorization if the type of interface module is allowable in the scope of this request— or it responds with a denial of authorization in case that the type of interface module is not allowable in the scope of the request. The database entity 107 may reside locally inside in the same network site as the control node 106 or in a more centralized point further up in the core network of the telecommunications network 100. The main task of that database entity is to hold the information repository for all interface types (or pluggable interface modules) permitted to be used within the system, per policy defined by the operator of the telecommunications network 100.

The rules contained in the database allow for restricting specific vendors, specific reach, wavelength, bitrate, fiber type, transmission type or other properties of the pluggable interface modules.

Figure 3:
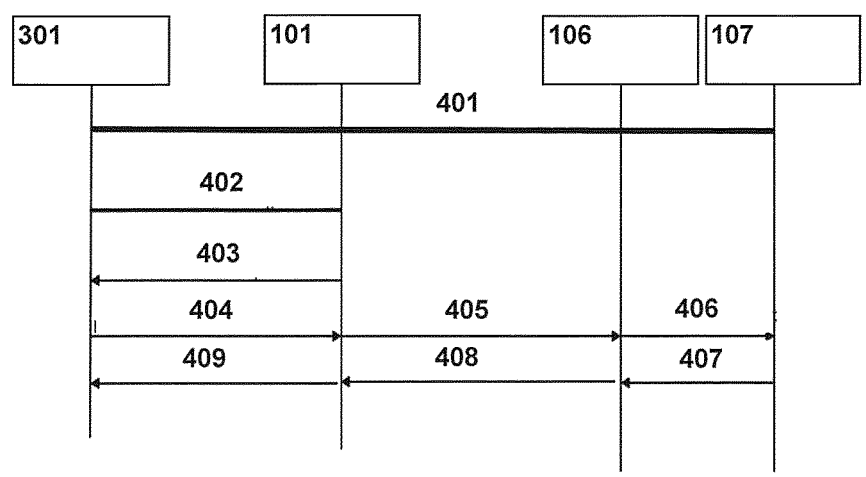
FIG. 3 schematically illustrates an example of a communication diagram relating to centralized port discovery and verification, especially related to pluggable interface modules.

FIG. 3 schematically illustrates an example of a communication diagram relating to centralized port discovery and verification, especially related to pluggable interface modules. The example shown in FIG. 3 refers to the specific pluggable interface module 301 being plugged into the specific line termination node 101.

A first processing step 401 refers to a discovery step of the specific pluggable interface module 301 by the specific line termination node 101.

A second processing step 402 refers to sensing of the specific pluggable interface module 301 by the specific line termination node 101. The access node ports are set to be in autosensing mode. Especially, the access node ports are configured to be in an autosensing mode. The insertion of the specific pluggable interface module 301, i.e. the act of inserting the interface plugin (or pluggable interface module) into the specific access node port P1 (corresponding to the first step according to an exemplary embodiment of the inventive method), triggers an interface module discovery message—in a third processing step 403, especially by transmitting the interface module discovery message (in an eighth step of an exemplary embodiment of the inventive method) from the specific line termination node 101 to the specific pluggable interface module 301 (and/or from the specific access node port P1 to the specific pluggable interface module 301)—sent out (by the specific access node port P1 or the specific line termination node 101) to request the interface type information of the specific pluggable interface module 301. In a fourth processing step 404, the interface module information related to the specific pluggable interface module is transmitted, still during the eighth step of an exemplary embodiment of the inventive method, as part of a discovery response message to the specific line termination node 101 (and/or to the specific access node port P1 of the specific line termination node 101). Especially, the discovery response message comprises, either as part of the interface module information or besides the interface module information a port identification (port ID) request.

In the next phase (corresponding to a fifth processing step 405), the specific line termination node 101 (i.e. the line termination node 101 being related to the specific pluggable interface module 301) sends an interface module request (especially an interface topology and type information) via access node (e.g. OLT) to the control node 106. This corresponds to the second step of an exemplary embodiment of the inventive method, where a request message is transmitted, by the specific line termination node 101, to the control node 106, and wherein the request message comprises the interface module information related to the specific pluggable interface module 301. Via the request message, an activation clearance is requested from the control node 106.

It is preferred according to the present invention that in a sixth processing step 406, a type verification request is transmitted from the control node 106 to the database entity 107. This corresponds to the fifth step of an exemplary embodiment of the inventive method, and the verification request message comprises at least part of the interface module information related to the specific pluggable interface module 301. The type verification request or type verification request message queries the database (or database entity 107) for module identification information of the specific pluggable interface module 301 (i.e. the pluggable interface module whose plugging in into an access node port and subsequent discovery procedure has triggered the interface module request (or request message) that led to the type verification request message).

In the sixth step according to an exemplary embodiment of the inventive method, the verification operation and/or the activation clearance operation is performed, preferably at the database entity 107. Alternatively, the activation clearance operation is performed at either the control node 106 or another entity (within the telecommunications network 100) being accessible by the control node 106.

In a seventh processing step 407, corresponding to the seventh step according to an exemplary embodiment of the inventive method, a verification acknowledgement message is transmitted, by the database entity 107 (or by another entity within the telecommunications network 100) to the control node 106, wherein the verification acknowledgement message comprises, in case that the verification operation and/or the activation clearance operation is successfully terminated, acknowledgement information related to the specific pluggable interface module 301 being permitted to be activated at the specific access node port P1 (of the specific line termination node 101). This means that if the type of the specific pluggable interface module 301 is already contained in the database (of the database entity 107)—i.e. the verification operation and/or the activation clearance operation can be successfully terminated —, the database entity 107 sends a type verification acknowledge message (verification acknowledgement message) as response towards the control node 106. The control node 106 translates this (verification acknowledgement message) message into an interface topology and type acknowledgement message, and transmits it, in an eighth processing step 408, to the specific line termination node 101. This corresponds to the third step according to an exemplary embodiment of the inventive method where the specific line termination node 101 receives, from the control node 106 and in case that a verification operation and/or an activation clearance operation is successfully terminated, an acknowledgement message (verification acknowledgement message) related to the activation clearance requested by the request message.

Via the acknowledgment message received by the specific line termination node 101, the access node port activation or the activation of the specific pluggable interface module 301 is performed by the specific line termination node 101 (and/or by its specific access node port P1), corresponding to the fourth step according to an exemplary embodiment of the inventive method and to a ninth processing step 409 represented in FIG. 3.

Hence, an automatic centralized activation of pluggable interface modules is performed, based on an automated centralized type repository of pluggable interface modules and a database-backed auto-discovery, identification and verification of interface modules.

If the type of the specific pluggable interface module 301 is listed in the database (of the database entity 107) and a media-dependent driver is not yet in use by the control node 106, the control node 106 may load this driver dynamically from a repository, the repository being either located at the database entity 107 or at another node or entity within the telecommunications network 100 being accessible by the control node 106. This corresponds to automatic driver management.

Preferably, semantics for driver identification are used. In case that the database (preferably of the database entity 107) either hosts the type of the pluggable interface module, it may request a next level database (not shown in FIG. 2).

Computing resources, especially for performing the verification operation and/or an activation clearance operation can either reside in the database entity 107 or in the control node 106 (or head node) or in another node or entity within the telecommunications network 100.

According to the present invention, it is advantageously possible to detect the insertion of such pluggables (or pluggable interface modules) that do not fit (or match) the intended use, e.g. normal gigabit Ethernet small form factor pluggables (GigE-SFPs) for ten gigabit ports (10G ports) or gigabit Ethernet bi-directional optical interfaces (GigE-BiDi-optics) in a gigabit passive optical network port (GPON-port). According to the present invention, any other mismatch is able to be notified as well as the combination of the type of the access node port, the topology information and the type of the pluggable interface module, and potential mismatch will not be accepted by the central database (especially of the database entity 107).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operation of a central office point of delivery, wherein the method comprises:

in response to a pluggable interface module being plugged into an access node port of a line termination node of the central office point of delivery, transmitting, by the line termination node, a request message to a control node of the central office point of delivery, wherein the central office point of delivery comprises at least one control node and a plurality of line termination nodes, wherein each line termination node of the plurality of line termination nodes comprises a number of access node ports, wherein each access node port of the plurality of access node ports is configured to receive or be connected to one of a plurality of pluggable interface modules, wherein the request message comprises interface module information related to the pluggable interface module, and wherein an activation clearance is requested, via the request message, from the control node;

transmitting, by the control node, a verification request message to the database entity, wherein the verification request message comprises at least part of the interface module information;

performing, by the database entity, a verification operation and/or an activation clearance operation;

transmitting, by the database entity, a verification acknowledgement message to the control node, wherein the verification acknowledgement message comprises, in case that the verification operation and/or the activation clearance operation have been successful, acknowledgement information related to the pluggable interface module being permitted to be activated at the access node port;

receiving, by the line termination node, from the control node, an acknowledgement message related to the activation clearance requested by the request message, wherein the acknowledgement message corresponds to the verification operation and/or the activation clearance operation having been successful; and activating, by the line termination node and/or by the access node port, the pluggable interface module.

2. The method according to claim 1, wherein the control node has access to a database entity of the central office point of delivery and/or of a broadband access network of a telecommunications network, and wherein the method further comprises:

after transmitting the verification acknowledgement message, forwarding, by the line termination node, the acknowledgement message related to the activation clearance requested by the request message.

3. The method according to claim 1, wherein the verification request message comprises a type verification request, wherein, via the type verification request, the database entity is queried for interface module type and/or identification information related to the pluggable interface module;

wherein the verification operation and/or the activation clearance operation having been successful is based on the database entity comprising the interface module type and/or identification information related to the pluggable interface module.

4. The method according to claim 3, wherein in case that a driver module corresponding to the type of the pluggable interface module is not yet in use by the control node, the control node accesses such a driver module corresponding to the type of the pluggable interface module from a repository entity.

5. The method according to claim 1, wherein, as part of performing the verification operation and/or the activation clearance operation, a type verification and/or a topology verification is performed by the database entity, wherein the verification operation and/or the activation clearance operation is successful based on the pluggable interface module fitting the access node port of the line termination node and/or a network topology property corresponding to the access node port of the specific line termination node.

6. The method according to claim 1, wherein the method further comprises:

after the pluggable interface module is plugged into the access node port and before transmitting the request message, transmitting, by the line termination node and/or by the access node port of the line termination node, an interface module discovery message to the pluggable interface module; and receiving, by the line termination node and/or the access node port of the line termination node, a discovery response message from the pluggable interface module, wherein the discovery response message comprises the interface module information related to the pluggable interface module.

7. The method according to claim 1, wherein the plurality of line termination nodes are part of a switching fabric or connected to the switching fabric, wherein the switching fabric is part of a broadband access network of a telecommunications network, and wherein the switching fabric comprises a plurality of spine network nodes and a plurality of leaf network nodes.

8. A telecommunications network for operation of a central office point of delivery, wherein the telecommunications network comprises:

the central office point of delivery, wherein the central office point of delivery comprises at least one control node and a plurality of line termination nodes, wherein each line termination node of the plurality of line termination nodes comprises a number of access node ports, wherein each access node port of the plurality of line termination nodes is configured to receive or be connected to one of a plurality of pluggable interface modules;

wherein a specific pluggable interface module is plugged into an access node port of a line termination node;

wherein the line termination node is configured to transmit a request message to a control node, wherein the request message comprises interface module information related to the pluggable interface module, and wherein an activation clearance is requested, via the request message, from the control node;

wherein the line termination node is configured to receive, from the control node an acknowledgement message related to the activation clearance requested by the request message, wherein the acknowledgement message corresponds to a verification operation and/or an activation clearance operation having been successful;

wherein the line termination node and/or the access node port is configured to activate the pluggable interface module;

wherein the central office point of delivery and/or a broadband access network of the telecommunications network comprises a database entity;

wherein the control node has access to the database entity;

wherein the control node is configured to transmit a verification request message to the database entity, wherein the verification request message comprises at least part of the interface module information related to the specific pluggable interface module;

wherein the database entity is configured to perform the verification operation and/or the activation clearance operation; and wherein the database entity is configured to transmit a verification acknowledgement message to the control node, wherein the verification acknowledgement message comprises, in case that the verification operation and/or the activation clearance operation have been successful, acknowledgement information related to the pluggable interface module being permitted to be activated at the access node port.

9. The telecommunications network according to claim 8, wherein the line termination node is configured to forward the verification acknowledgement message as the acknowledgement message related to the activation clearance requested by the request message.

10. The telecommunications network according to claim 8, wherein the line termination node and/or the access node port of the line termination node is configured to transmit an interface module discovery message to the pluggable interface module; and wherein the line termination node and/or the access node port of the line termination node is configured to receive a discovery response message from the pluggable interface module, wherein the discovery response message comprises interface module information related to the pluggable interface module.

11. A control node of a central office point of delivery of a broadband access network, wherein the control node comprises a processor and a non-transitory memory having processor-executable instructions stored thereon, wherein the processor-executable instructions, when executed by the processor, facilitate:

receiving, by the control node, a request message from a line termination node in case that a pluggable interface module is plugged into an access node port of the specific line termination node, wherein the request message comprises interface module information related to the pluggable interface module, and wherein, via the request message, an activation clearance is requested;

transmitting, by the control node, a verification request message to the database entity to facilitate the database entity performing a verification operation and/or an activation clearance operation, wherein the verification request message comprises at least part of the interface module information;

receiving, by the control node, a verification acknowledgement message from the database entity, wherein the verification acknowledgement message comprises, based on the verification operation and/or the activation clearance operation having been successful, acknowledgement information related to the pluggable interface module being permitted to be activated at the access node port; and in response to the verification operation and/or the activation clearance operation having been successful, transmitting, by the control node, an acknowledgement message related to the activation clearance requested by the request message to the line termination node, so as to facilitate the pluggable interface module being activated by the line termination node and/or by the access node port.

12. A non-transitory computer-readable medium having processor-executable instructions stored thereon for operation of a central office point of delivery, wherein the processor-executable instructions, when executed, facilitate:

in response to a pluggable interface module being plugged into an access node port of a line termination node of the central office point of delivery, transmitting, by the line termination node, a request message to a control node of the central office point of delivery, wherein the central office point of delivery comprises at least one control node and a plurality of line termination nodes, wherein each line termination node of the plurality of line termination nodes comprises a number of access node ports, wherein each access node port of the plurality of access node ports is configured to receive or be connected to one of a plurality of pluggable interface modules, wherein the request message comprises interface module information related to the pluggable interface module, and wherein an activation clearance is requested, via the request message, from the control node;

transmitting, by the control node, a verification request message to the database entity, wherein the verification request message comprises at least part of the interface module information;

performing, by the database entity, a verification operation and/or an activation clearance operation;

transmitting, by the database entity, a verification acknowledgement message to the control node, wherein the verification acknowledgement message comprises, in case that the verification operation and/or the activation clearance operation have been successful, acknowledgement information related to the pluggable interface module being permitted to be activated at the access node port;

receiving, by the line termination node, from the control node, an acknowledgement message related to the activation clearance requested by the request message, wherein the acknowledgement message corresponds to the verification operation and/or the activation clearance operation having been successful; and activating, by the line termination node and/or by the access node port, the pluggable interface module.

\* \* \* \* \*